United States Patent [19]

Taka et al.

[11] Patent Number: 5,361,118
[45] Date of Patent: Nov. 1, 1994

[54] DISTANCE MEASURING APPARATUS

[75] Inventors: Hideo Taka; Kazuyuki Maeda, both of Yokohama, Japan

[73] Assignee: Canon Kabushiki Kaisha, Tokyo, Japan

[21] Appl. No.: 169,756

[22] Filed: Dec. 20, 1993

Related U.S. Application Data

[63] Continuation of Ser. No. 920,914, Jul. 28, 1992, abandoned.

[30] Foreign Application Priority Data

| Jul. 30, 1991 | [JP] | Japan | 3-190313 |
| Jul. 31, 1991 | [JP] | Japan | 3-191995 |
| Jul. 31, 1991 | [JP] | Japan | 3-191996 |
| Jul. 31, 1991 | [JP] | Japan | 3-191997 |

[51] Int. Cl.⁵ .............................. G03B 7/00; G01J 1/20
[52] U.S. Cl. .................................. 354/403; 250/201.4; 250/201.6
[58] Field of Search ............... 354/403, 400, 402; 250/201.4, 201.6

[56] References Cited

U.S. PATENT DOCUMENTS

| 4,415,246 | 11/1983 | Karasaki et al. | 250/201 X |
| 4,752,799 | 6/1988 | Stauffer | 250/201 X |
| 4,767,934 | 8/1988 | Stauffer | 250/201 X |
| 4,831,404 | 5/1989 | Fujita et al. | 354/403 |
| 4,933,702 | 6/1990 | Komatsuzaki et al. | 354/400 |
| 4,947,202 | 8/1990 | Kitajima et al. | 354/403 |
| 5,006,700 | 4/1991 | Kosaka et al. | 354/403 X |
| 5,051,766 | 9/1991 | Nonaka et al. | 354/403 X |
| 5,128,529 | 7/1992 | Nagaoka et al. | 354/403 X |

FOREIGN PATENT DOCUMENTS

| 0291312 | 11/1988 | European Pat. Off. |
| 2516138 | 10/1976 | Germany |
| 3009535 | 9/1981 | Germany |
| 60-19116 | 1/1985 | Japan |

*Primary Examiner*—Michael L. Gellner
*Assistant Examiner*—Jae N. Noh
*Attorney, Agent, or Firm*—Fitzpatrick, Cella, Harper & Scinto

[57] ABSTRACT

A distance measuring apparatus includes a light projecting device for projecting a light toward an object, a first light receiving device for receiving reflected light from the object; a second light receiving device for receiving light which is reflected by glass positioned between the distance measuring apparatus and the object; a distance calculator device for evaluating an output from the first light receiving device to calculate a distance to the object; and a distance information evaluator device for detecting a presence of glass based on an output from the second light receiving device, and for setting predetermined distance information, irrespective of the distance to the object calculated by the distance calculator device, when the presence of glass is detected.

25 Claims, 13 Drawing Sheets

FIG. 4
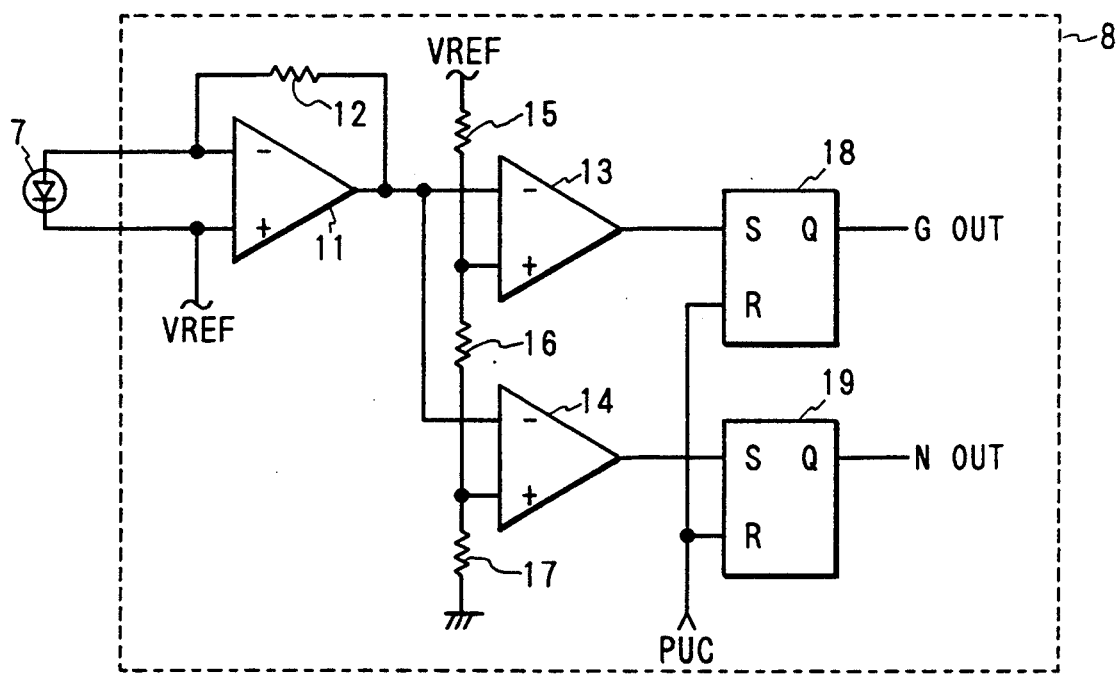
FIG. 5A  6.0m  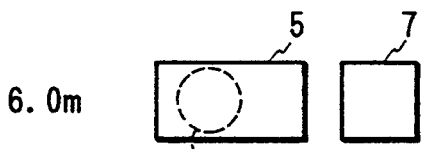
FIG. 5B  1.2m  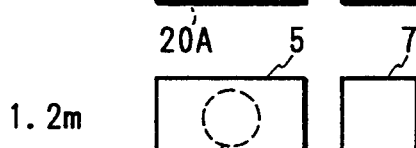
FIG. 5C  0.6m  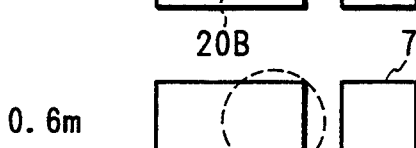
FIG. 5D  0.4m  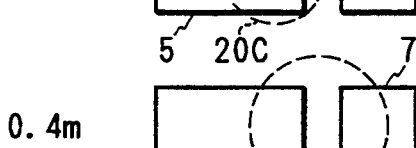
FIG. 5E  0.2m  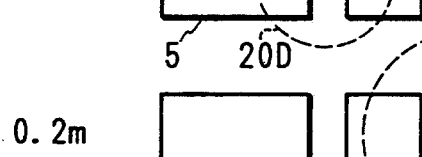

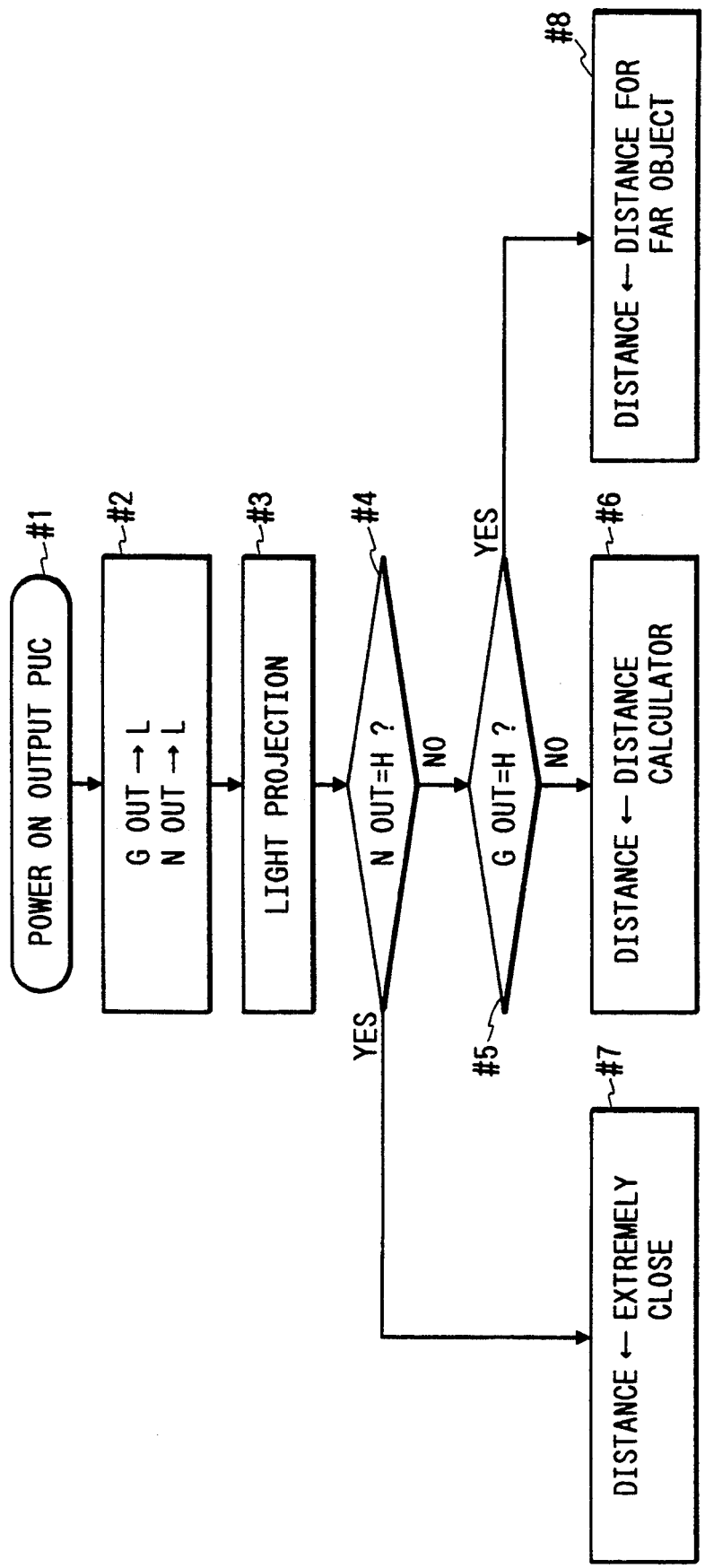

DISTANCE MEASURING APPARATUS

This application is a continuation of application Ser. No. 07/920,914 filed Jul. 28, 1992, now abandoned.

BACKGROUND OF THE INVENTION

1. Field of the Invention

This invention relates to a distance measuring apparatus of the active type for use in an auto focus camera or the like.

2. Description of the Related Art

A distance measuring apparatus of the active type, as shown in FIG. 7 of the accompanying drawings, usually has a light projection lens 2 and a light receiving lens 3 fixed to a camera body 1, and light projected from a light projection element 4 through the light projection lens 2 is reflected by an object and is imaged on a light receiving element 5 through the light receiving lens 3. The imaged position on the light receiving element 5 changes in conformity with the distance of the object and therefore, the apparatus is designed such that the light receiving position is detected by a semiconductor position detector (hereinafter referred to as the PSD) and the distance to the object is calculated.

In the above-described example of the prior art, however, where a glass 6 is in front of the camera body 1, most of the light projected from the light projection element 4 through the light projection lens 2 is transmitted through the glass 6, but light which is slightly diffused and reflected between the front surface (or the back surface) of the glass 6 and the camera body 1 generally irradiates the light receiving element (PSD) 5 through the light receiving lens 3. Accordingly, when an attempt is made to photograph a distant view from an observation room in a multistory building or a tower through window glass, since the object is a distant view, principal rays transmitted through the glass 6 are not reflected back, while diffused and reflected light from the glass generally irradiates the light receiving element 5 and therefore, for example, a medium distance of 1 m to 2 m is measured, and this has led to the disadvantage that an out-of-focus photograph results.

This problem becomes particularly remarkable due to the shortened distance between the light projection lens and the light receiving lens resulting from the downsizing of the camera and has therefore formed a bottleneck in the downsizing of the camera.

Also, some of distance measuring apparatuses of the active type are provided with a plurality of distance measuring fields of view.

In a distance measuring apparatus having a plurality of distance measuring fields of view, as shown in FIG. 17 of the accompanying drawings, light projected from a plurality of light projection elements 1, 2 and 3 is projected onto objects 5, 6 and 7 through a light projection lens 4. The light reflected by the objects 5, 6 and 7 is imaged on a plurality of two-division SPCs 9, 10 and 11 through a light receiving lens 8. The reference numeral 12 designates a camera body including the distance measuring apparatus. The two-division SPCs 9, 10 and 11, as shown in FIG. 18A of the accompanying drawings, are comprised of SPCs 9F, 10F, 11F close to the light projection elements and SPCs 9N, 10N, 11F on the opposite side. The projected lights on the two-division SPCs when the object distances are 6 m, 1.2 m and 0.6 m are imaged as shown by 9B, 10B, 11B in FIG. 18B, 9C, 10C, 11C in FIG. 18C and 9D, 10D, 11D in FIG. 18D, respectively. The distances of the objects 5, 6 and 7 are found by calculating the ratio of a quantity of light on 9F and 9N, the ratio of a quantity of light on 10F and 10N and the ratio of a quantity of light on 11F and 11N.

In the above-described example of the prior art, however, when an attempt is made to photograph a distant view through the window glass of an observation room in a multistory building or a tower or through a train window, as shown in FIG. 19 of the accompanying drawings, most of light projected from the light projection element 2 through the light projection lens 4 is transmitted through glass 100, but light which is slightly diffused and reflected between the front surface (or the back surface) of the glass 100 and the camera body 12 generally irradiates the light receiving elements 9, 10 and 11 through the light receiving lens 8 and therefore, the result of the distance measurement from the output of the light receiving element 10 corresponding to the light projection element 2 is a medium distance of e.g. 1 m–2 m, and this has led to the disadvantage that an out-of-focus photograph results. Also, if a medium distance is measured in any one of the plurality of fields of view, an out-of-focus photograph will result, and this has also posed a problem in effecting the enhanced specification of a camera, i.e., a plurality of distance measuring fields of view.

SUMMARY OF THE INVENTION

It is one aspect of the present invention to solve the above-noted problems peculiar to the prior-art apparatuses and to provide an improved distance measuring apparatus which, without making a camera bulky, can appropriately automatically measure the distance of objects in short distance photographing through glass and in long distance photographing through glass.

Other objects of the present invention will become apparent from the following detailed description of the invention.

BRIEF DESCRIPTION OF THE DRAWINGS

FIG. 4 is a block diagram of output level discriminator means in a second embodiment of the present invention.

FIGS. 5A to 5E show the imaging of reflected light onto a light receiving element by according to the object distance.

FIG. 6 is a flow chart showing the operation of the second embodiment.

DESCRIPTION OF THE PREFERRED EMBODIMENTS

First Embodiment

Figure 1:
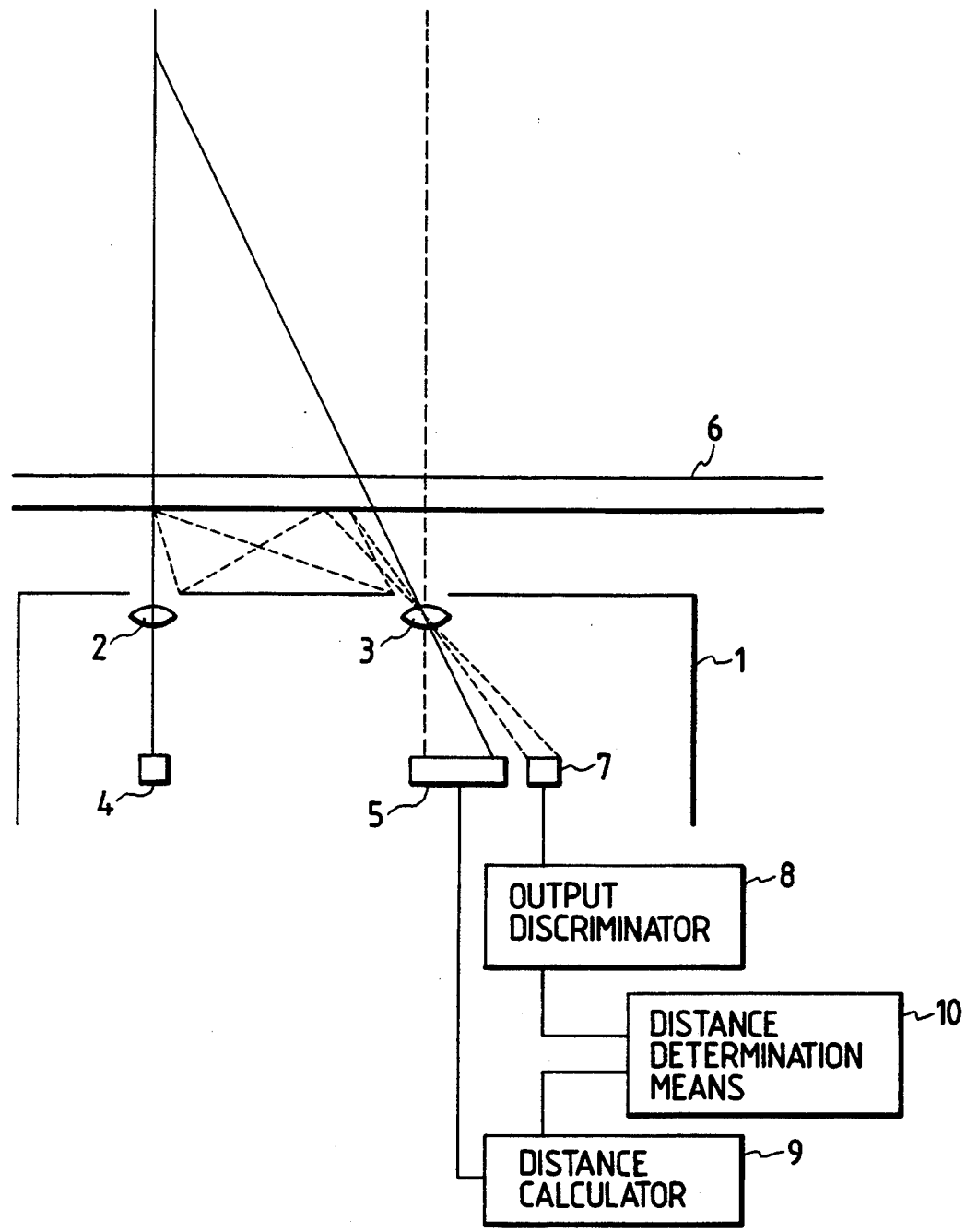
FIG. 1 is a block diagram of a camera according to a first embodiment of the present invention.
Figure 8:
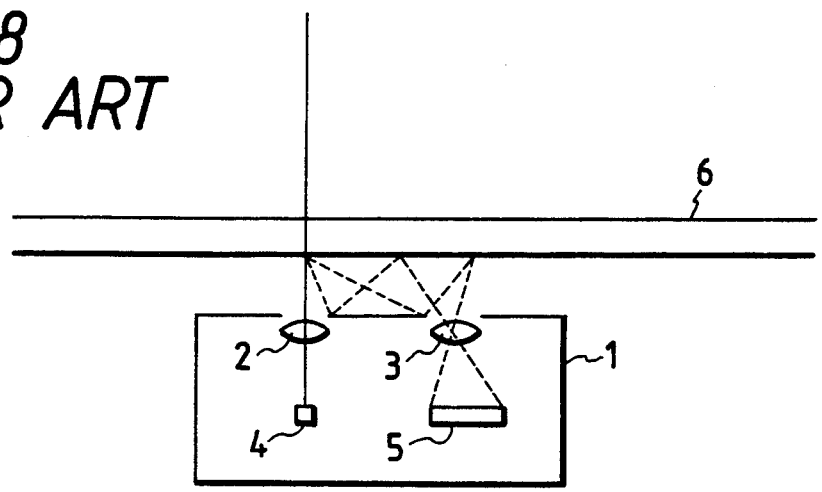
FIG. 8 shows the optical path of reflected light when photographing through glass is effected.

FIG. 1 shows a first embodiment of the distance measuring apparatus of the present invention. In FIG. 1, members designated by the reference numerals 1-6 are the same as those in the example of the prior art shown in FIG. 8 and therefore need not be described. The reference numeral 7 denotes a light receiving element for glass detection for receiving light from outside the normal distance measuring range diffused and reflected by glass and a camera body, the reference numeral 8 designates output discriminator means for discriminating the presence or absence of the output of the light receiving element for glass detection 7, the reference numeral 9 denotes distance calculator means of the conventional double integration type proposed by the applicant, and the reference numeral 10 designates distance determination means which receives the outputs of the output discriminator means 8 and the distance calculator means 9 as inputs.

Figure 2:
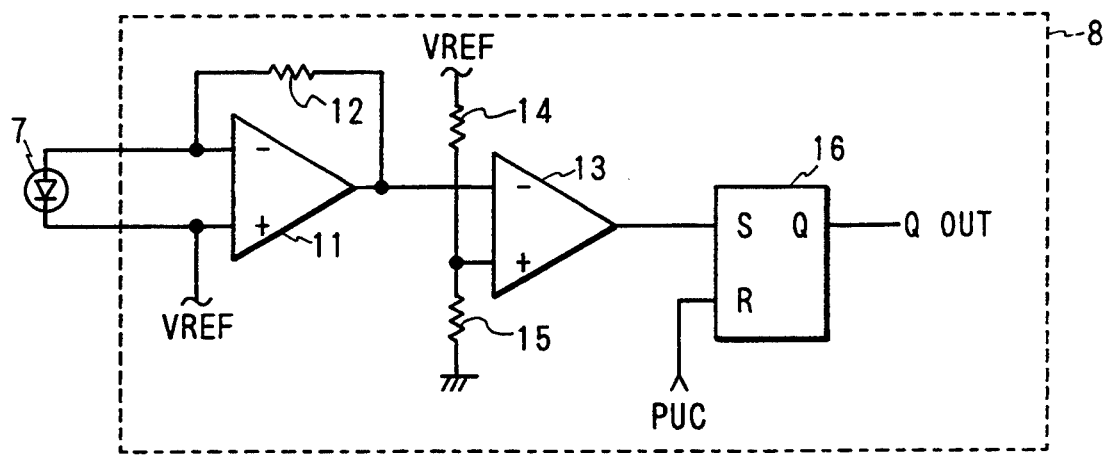
FIG. 2 is a circuit diagram of an embodiment of the output discriminator means of FIG. 1.

Referring now to FIG. 2 which shows an embodiment of the output discriminator means, the reference numeral 11 denotes an operational amplifier, and the reference numeral 12 designates a resistor which converts the photocurrent by the reflected light received by the light receiving element 7 for glass detection into a voltage. The reference numeral 13 denotes a comparator, and the reference numerals 14 and 15 designate resistors. The output of the comparator 13 assumes H level when the output of the operational amplifier 11 drops below a voltage obtained by a reference voltage $V_{REF}$ being divided by the resistors 14 and 15. The reference numeral 16 denotes an SR type flip-flop adapted to be reset by a power up clear signal PUC from a power source ON detecting circuit, not shown, and to be set by the output of the comparator 13 and to put out a discrimination output $Q_{OUT}$.

Figure 3:
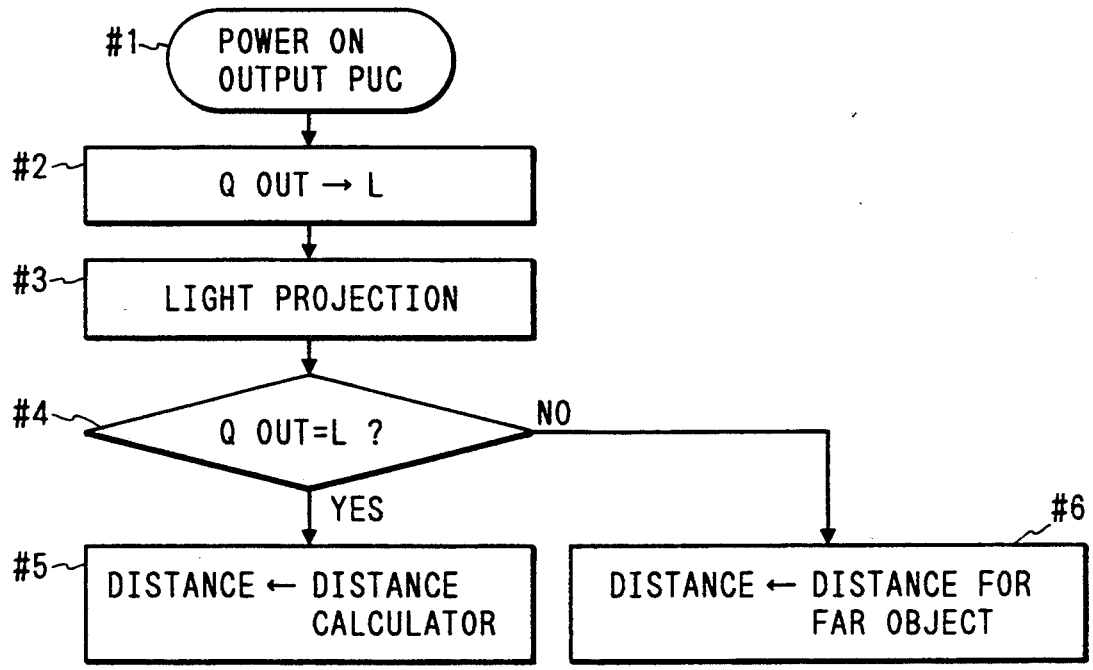
FIG. 3 is a flow chart showing the operation of the camera of FIG. 1.
Figure 7:
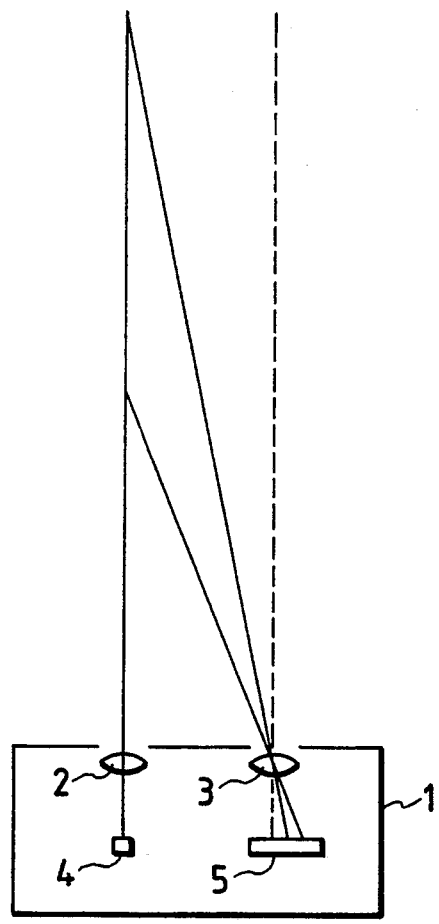
FIG. 7 shows the construction of the light projection and receiving optical system of a distance measuring apparatus in a camera.

The operation of the above-described construction will now be described with reference to the flow chart of FIG. 3. At #1, the power up clear signal PUC during the closing of a power source switch is output, and the discrimination output $Q_{OUT}$ of the flip-flop 16 assumes L level (#2). At #3, light projection by the light projection element 4 is started.

(i) The Case of an Ordinary Object

Reflected light from an object is imaged on the light receiving element 5, but is not received by the light receiving element 7 and therefore, the output voltage of the operational amplifier 11 is at the same potential as the reference voltage $V_{REF}$, and the output of the comparator 13 remains at L level and the discrimination output $Q_{OUT}$ of the flip-flop 16 also remains at L level (#4). Accordingly, the distance determination means 10 determines the distance from the output of the distance calculator means 9(#5).

(ii) The Case of a Distant View through Window Glass

Since light diffused and reflected by the glass 6 and the camera body 1 enters the light receiving element 7, the output voltage of the operational amplifier 11 drops from the reference voltage $V_{REF}$ by the voltage drop in the resistor 12 and becomes equal to or less than the divided voltage value by the resistors 14 and 15, and the output of the comparator 13 assumes H level and therefore, the discrimination output $Q_{OUT}$ of the flip-flop 16 assumes H level (#4). Accordingly, the distance determination means 10, irrespective of the output of the distance calculator means 9, determines a distance suitable for long distance photographing, such as infinity distance or the over focus distance of a photo-taking lens.

While the output discriminator means of the above-described embodiment directly discriminates the sensor output by the comparator, most of the projected light beam from the light projection element is transmitted through the glass and the quantity of light diffused and reflected by the surface of the glass and received by the light receiving element for glass detection 7 is small and therefore, when an erroneous discrimination by noise or the like is taken into account, it is preferable to discriminate the sensor output after being integrated. Also, the input to the distance calculator means 9 may be changed over, whereby the outputs of the light receiving element 5 for ordinary distance measurement and the light receiving element 7 for glass detection may be time-divisionally input to the distance calculator means, and the distance calculator means may be used also as the output discriminator means.

While in the above-described embodiment, the light receiving element for glass detection is disposed usually on the other side of the light receiving element for distance measurement, the light receiving element for glass detection may be disposed on the other side of the light receiving element for distance measurement because the diffused and reflected light enters the latter. The light receiving element for glass detection need not be arranged in the direction of the base line length.

As described above, according to the present embodiment, the presence or absence of the output of the light receiving element for glass detection which receives the light from outside the distance measuring range diffused and reflected by the glass and the camera body is discriminated and when the output is present, a predetermined distance is set, whereby it becomes possible to photograph a distant view from an observation room in a multistory building or a tower or from a train window through glass without affecting the ordinary distance measuring range.

Second Embodiment

In the first embodiment, provision is made of a light receiving element exclusively for receiving diffused and reflected light from glass and correct distance measurement is made possible even through glass. In a second embodiment which will hereinafter be described, the element for glass detection is used also as a light receiving element for distance detection, whereby the photographing of any object at an extremely close distance which has heretofore been difficult is made possible.

The basic construction of the distance measuring apparatus according to the second embodiment is similar to that of the first embodiment (FIG. 1), but in the second embodiment, the light receiving element 7 for glass detection is used also as an element for extremely close distance measurement and the output level discriminator means 8 evaluates the output level of the light receiving element in three stages.

FIG. 4 is a circuit diagram of the output level discriminator means 8 in the second embodiment. The reference numeral 11 designates an operational amplifier, and the reference numeral 12 denotes a resistor which converts the photocurrent received by the light receiving element 7 into a voltage. The reference numerals 13 and 14 designate comparators, and the reference numerals 15, 16 and 17 denote resistors. A value obtained by dividing the reference voltage $V_{REF}$ by the resistors 15, 16 and 17 and the output voltage of the operational amplifier 11 are compared with each other. The reference numerals 18 and 19 designate SR type flip-flops adapted to be reset by the power up clear signal PUC from a power source ON detecting circuit, not shown, and to be set by the H level outputs of the comparators 13 and 14, respectively, and put out a glass detection output $G_{OUT}$ and an extremely close distance detection output $N_{OUT}$.

FIG. 5 shows the images 20A, 20B, 20C, 20D and 20E of the light projection element 4 formed on the light receiving element 5 and the light receiving element 7 when the object distance is 6.0 m (FIG. 5A), 1.2 m (FIG. 5B), 0.6 m (FIG. 5C), 0.4 m (FIG. 5D) and 0.2 m (FIG. 5E). As the distance becomes shorter from FIG. 5A to FIG. 5E, the center of the image of the light projection element 4 moves and the image which is in focus at 1.2 m becomes blurred and larger. Here, the ordinary distance measuring range is 6.0 m–0.6 m, the image is almost in the light receiving element 5, and the variation in the output for the variation in the distance has linearity. In the case of 0.4 m shown in FIG. 5D, the image 20D is astride the light receiving element 5 and the light receiving element 7 and the center thereof deviates from the light receiving element 5 and therefore, the variation in the output for the variation in the distance has no linearity. Also, the rate of the image on the light receiving element 7 is small, but the light receiving power of this element is great because the distance thereof is short. In the case of 0.2 m shown in FIG. 5E, the image 20E is not on the light receiving element 5 and the blur of the image is great and therefore, about ¼ to 1/5 of the image 20E is formed on the light receiving element 7 and the light receiving power of this element is great.

The operation of the above-described construction will now be described with reference to the flow chart of FIG. 6.

When at #1, the power up clear signal PUC during the closing of the power source switch is output, the flip-flops 18 and 19 are reset, and the outputs $G_{OUT}$ and $N_{OUT}$ assume L level (#2).

At #3, the light projection by the light projection element 4 is started.

(i) When the Object is in the Ordinary Distance Measuring Range (6 m–0.6 m)

The light reception outputs by the projected light images 20A, 20B and 20C formed on the light receiving element 5 as shown in FIGS. 5A, 5B and 5C are calculated by the distance calculator means 9 and are input as distance information to the distance determination means 10. Since the projected light images 20A, 20B and 20C are not formed on the light receiving element 7, the output of the operational amplifier 11 of the output level discriminator means 8 assumes the same voltage as the reference voltage $V_{REF}$ and the outputs of the comparators 13 and 14 remain at L level. Since the outputs $G_{OUT}$ and $N_{OUT}$ are also at L level, the distance determination means 10 determines the distance by the output of the distance calculator means 9 as shown at #6 via #4 and #5.

(ii) When the Object is at an Extremely Close Distance (0.4 m–0.2 m)

When as shown in FIG. 5D, a part of the projected light image 20D is on the light receiving element 5, the distance information calculated by the distance calculator means 9 is a distance shorter than 0.6 m but longer than 0.4 m. The movement of the center of gravity on the light receiving element 5 is small relative to the movement of the center of gravity of the image.

Also, when as shown in FIG. 5E, the projected light image 20E is not on the light receiving element 5, there is no signal entering the distance calculator means 9 and therefore, if only the output of the light receiving element 5 is evaluated, the distance information of infinity is put out. On the other hand, in both the case of FIG. 5D and the case of FIG. 5E, a part of the projected light image 20D or 20E is on the light receiving element 7 and the distance is short and therefore, the electric current output from the light receiving element 7 is great and the output voltage of the operational amplifier 11 becomes a voltage low enough to render the output of the comparator 14 into H level, and the flip-flop 19 is set and the extremely close distance detection output $N_{OUT}$ also assumes H level and therefore, as shown at #7, irrespective of the output of the distance calculator means 9, it is determined that the object is at an extremely close distance.

(iii) When the Object is a Distant View through Glass

In this case, the light diffused and reflected by the glass 6 and the camera body 1 generally irradiates the light receiving elements 5 and 7. Accordingly, the center of the light entering the light receiving element 5 is substantially the center of the light receiving element 5 and thus, the distance information calculated by the distance calculator means 9 is a distance of about 1.2 m. Also, most of the light projected from the light projection element 4 is transmitted through the glass 6 and part of the light reflected irradiates the light receiving element 7, and since the light receiving power of the light receiving element 7 is small, the output voltage of the operational amplifier 11 becomes a voltage which renders the output of the comparator 13 into H level but keeps the output of the comparator 14 at L level, and only the flip-flop 18 is set and only the glass detection output $G_{OUT}$ assumes H level and therefore, through #4 and #5, as shown at #8, the distance determination means 10 determines a distance for long distance photographing such as infinity distance or the over focus distance of the photo-taking lens, irrespective of the output of the distance calculator means 9.

In the above-described embodiment, glass detection and extremely close distance detection are effected by two comparators, but as compared with the light reception output at the extremely close distance, in glass detection, most of the light is transmitted through the glass and only a slight quantity of reflected light can be received and therefore, it is more preferable that only the extremely close distance be directly detected by the comparator and glass detection be effected by being integrated.

The input to the distance calculator means may be changed over, whereby the outputs of the light receiving element for distance measurement and the light receiving element for glass detection may usually be time-divisionally input to the distance calculator means, and the distance calculator means may be used also as the output level discriminator means.

As described above, according to the distance measuring apparatus of the present embodiment, the light receiving element for glass detection is used also as the light receiving element for extremely close distance detection, and the extremely close distance and glass are distinguished from each other by the magnitude of the light reception output level, whereby long distance photographing through glass becomes possible almost without an increase in cost.

Third Embodiment

A third embodiment is an application of the present invention to a distance measuring apparatus provided with a plurality of distance measuring fields of view.

Figure 9:
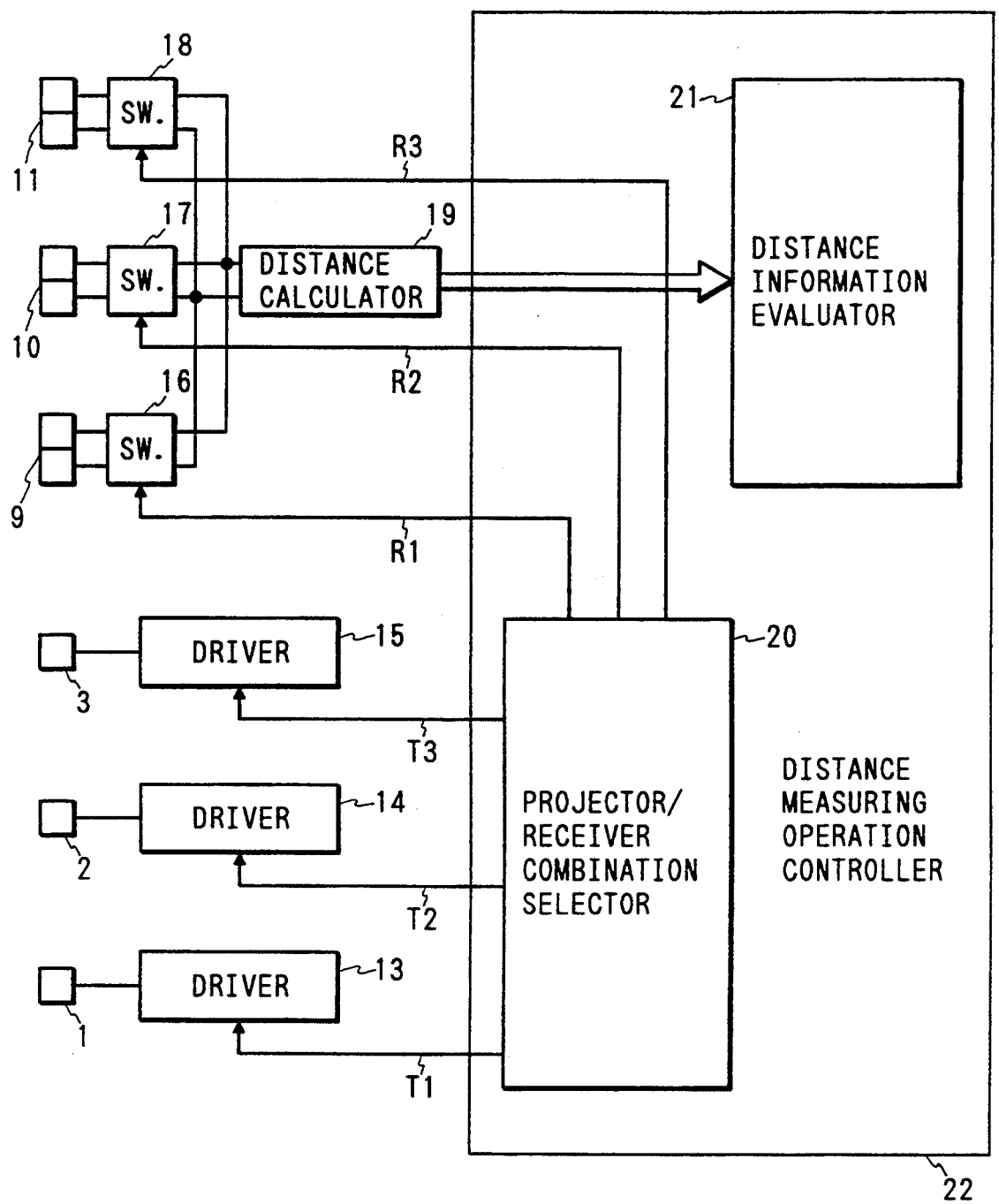
FIG. 9 is a block diagram of a distance measuring apparatus according to a third embodiment of the present invention.

FIG. 9 is a diagram which shows the features of the third embodiment of the present invention. In FIG. 9, the reference numerals 1, 2 and 3 designate light emitting elements such as infrared light emitting diodes, the reference numerals 9, 10 and 11 denote light receiving elements such as two-division SPCs, the reference numerals 13, 14 and 15 designate driver means controlled by control signals T1 and T2 from distance measuring operation controller means 22 which will be described later to cause the light emitting elements 1, 2 and 3 to emit light, the reference numerals 16, 17 and 18 denote switch means controlled by control signals R1, R2 and R3 from the distance measuring operation controller means 22 to change over the light reception outputs of the light receiving elements 9, 10 and 11, the reference numeral 19 designates distance calculator means which outputs 10 distance information such as light reception output magnitude distance signals, the reference numeral 20 denotes a projector/receiver combination selector which determines the combination of the light projection elements and light receiving elements in accordance with a distance measuring operation sequence and outputs the control signals T1, T2, T3 and R1, R2, R3, the reference numeral 21 designates distance information evaluator means which evaluates the distance information from the distance calculator means 19 in accordance with the distance measuring operation sequence and outputs the result of distance measurement, and the reference numeral 22 denotes distance measuring operation controller means which includes the projector/receiver combination selector means 20 and the distance information evaluator means 21 and controls the distance measuring operation sequence.

Figure 10:
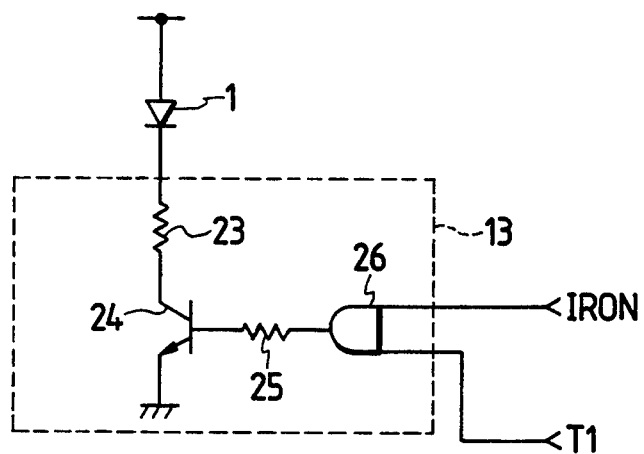
FIG. 10 is a circuit diagram of the driver means of FIG. 9.

FIG. 10 is a circuit diagram of the driver means 13 of FIG. 9. In FIG. 10, the reference numeral 23 designates a resistor for limiting the electric current, the reference numeral 24 denotes a transistor for driving the light emitting element 1, the reference numeral 25 designates a resistor for limiting the electric current, and the reference numeral 26 denotes an AND gate which receives as inputs the control signal T1 and a light emission timing signal IRON from a timing circuit, not shown, in the distance measuring operation controller means 22. When the control signal T1 is at H level, the light emitting element 1 is caused to emit light by the transistor 24 in accordance with the light emission timing signal IRON.

Figure 11:
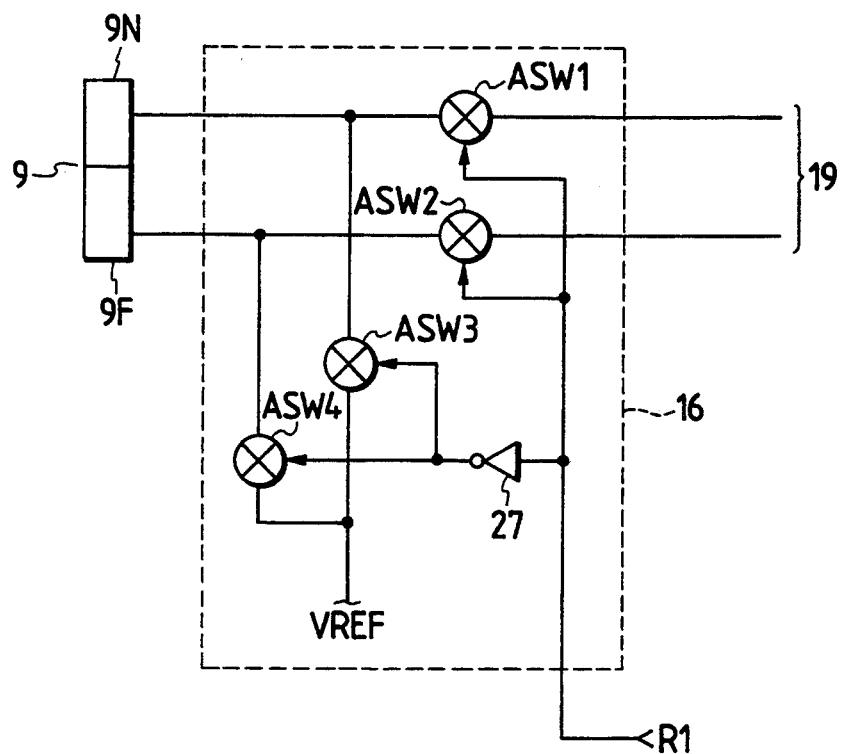
FIG. 11 is a circuit diagram of the switch means of FIG. 9.

FIG. 11 is a circuit diagram of the switch means 16 of FIG. 9. In FIG. 11, the reference numeral 27 designates an inverter which receives the control signal R1 as an input, and the reference characters ASW1, ASW2, ASW3 and ASW4 denote analog switches. When the control signal R1 is at H level, the output of the inverter 27 assumes L level and the analog switches ASW1 and ASW2 are ON and the analog switches ASW3 and ASW4 are OFF and therefore, the outputs 9F and 9N of the light receiving element 9 are connected to the distance calculator means 19, and when the control signal R1 is at L level, the output of the inverter 27 assumes H level and the analog switches ASW1 and ASW2 are OFF and the analog switches ASW3 and ASW4 are ON and therefore, the outputs 9F and 9N of the light receiving element 9 are connected to the reference voltage $V_{REF}$.

Figure 12:
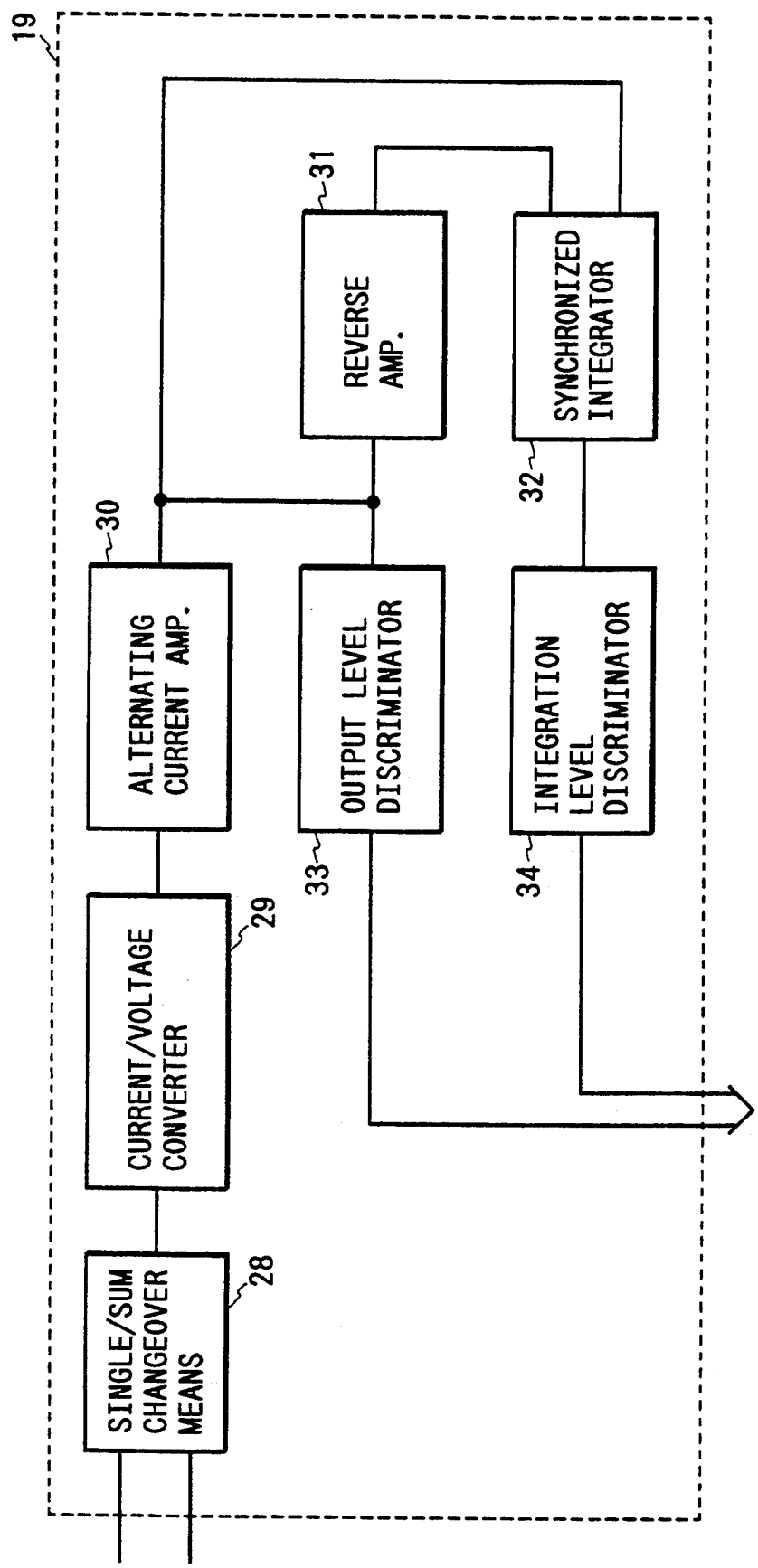
FIG. 12 is a block diagram of the distance calculator means of FIG. 9.

FIG. 12 is a block diagram of the distance calculator means 19 of FIG. 9. In FIG. 12, the reference numeral 28 designates single/sum changeover means for changing over one or the sum of sensor outputs from the switch means 16, 17 and 18, the reference numeral 29 denotes current/voltage converter means for converting the output current of the single/sum changeover means 28 into a voltage, the reference numeral 30 designates an alternating current amplifier for DC-cutting the output of the current/voltage converter means 29 and amplifying the alternating current signal component by the turn-on-and-off of the light emitting elements 1, 2 and 3, the reference numeral 31 denotes a reverse amplifier for reversing the output of the alternating current amplifier 30, the reference numeral 32 designates synchronized integrator means for selectively integrating the output of the alternating current amplifier 30 or the reverse amplifier 31 in synchronism with the turn-on-and-off of the light emitting elements 1, 2 and 3, the reference numeral 33 denotes output level discriminator means for comparing the amplitude of the alternating current amplifier 30 with a predetermined level and outputting it to the distance information evaluator means 21, and the reference numeral 34 designates integration level discriminator means for comparing the amount of integration by the synchronized integrator means 32 with a predetermined level and outputting it to the distance information evaluator means 21. The distance measuring operation by the single/sum changeover means 28, the current/voltage converter means 29, the alternating current amplifier 30, the reverse amplifier 31 and the synchronized integrator means 32 is similar to the one by the known double integration method disclosed in applicant's Japanese Laid-Open Patent Application No. 19116/1985.

Figure 13:
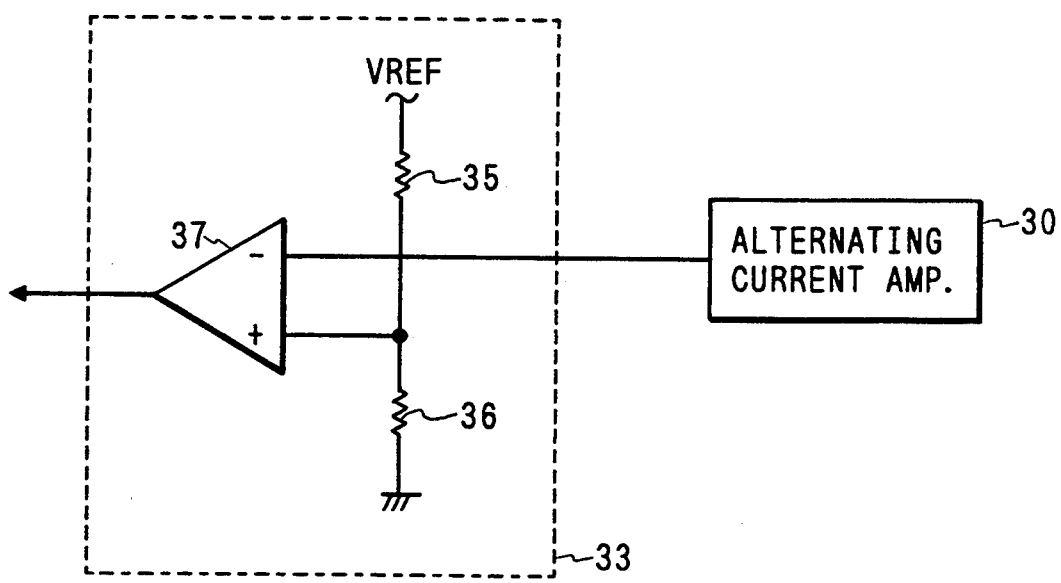
FIG. 13 is a circuit diagram of the output level discriminator means of FIG. 12.

FIG. 13 is a circuit diagram of the output level discriminator means 33 of FIG. 12. In FIG. 13, the reference numerals 35 and 36 denote resistors for dividing the reference voltage $V_{REF}$, and the reference numeral 37 designates a comparator for comparing the value divided by the resistors 35 and 36 with the output of the alternating current amplifier 30 and outputting it to the distance information evaluator means 21. When the light reception output is great, the output of the comparator assumes H level and decreases the gain of the alternating current amplifier 30 as required.

Figure 14:
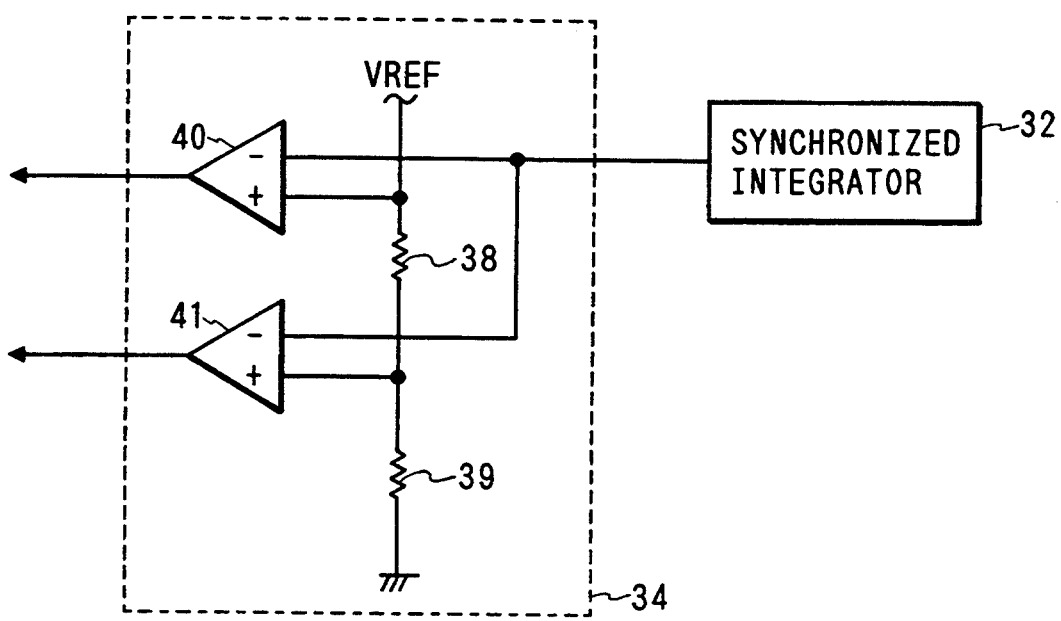
FIG. 14 is a circuit diagram of the integration level discriminator means of FIG. 12.

FIG. 14 is a circuit diagram of the integration level discriminator means 34 of FIG. 12. In FIG. 14, the reference numerals 38 and 39 denote resistors for dividing the reference voltage $V_{REF}$, the reference numeral 40 designates a comparator for comparing the output of the synchronized integrator means 32 with the reference voltage $V_{REF}$ and outputting it to the distance information evaluator means 21, and the reference numeral 41 denotes a comparator for comparing the output of the synchronized integrator means 32 with the value divided by the resistors 38 and 39 and outputting it to the distance information evaluator means 21. When the output of the comparator 41 is at L level after the synchronized integrator means 32 has integrated one light reception output for a predetermined time, the light reception output is small and therefore, the distance information evaluator means 21 judges that the light reception output is null, and when the output of the comparator 41 is at H level, the synchronized integrator means 32 reversely integrates both of the light reception outputs and when the result becomes equal to or greater than the reference voltage $V_{REF}$, the output of the comparator 40 changes from H level to L level, and by the time required therefor, the distance information evaluator means 21 calculates the distance.

Figure 15:
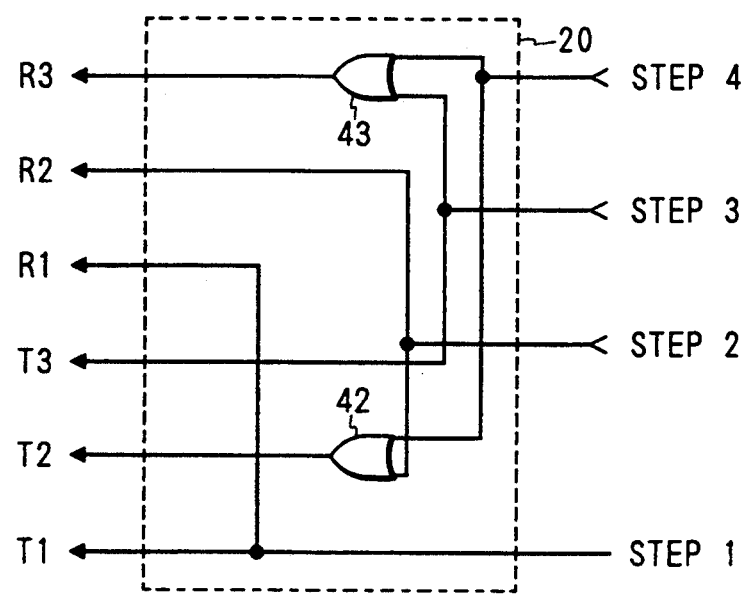
FIG. 15 is a circuit diagram of the projector/receiver combination selector of FIG. 9.

FIG. 15 is a circuit diagram of the projector/receiver combination selector means 20 of FIG. 9. In FIG. 15, the reference numerals 42 and 43 designate OR gates which output T1 and R1 to select the combination of the light projection element 1 and the light receiving element 9 by the STEP1 signal from the timing circuit, not shown, of the distance measuring operation controller means 22, output T2 and R2 to select the combination of the light projection element 2 and the light receiving element 10 by the STEP2 signal through the OR gate 42, output T3 and R3 to select the combination of the light projection element 3 and the light receiving element 11 by the STEP3 signal through the OR gate 43, and output T2 and R3 to select the combination of the light projection element 2 and the light receiving element 11 by the STEP4 signal through the OR gates 42 and 43.

Figure 18A:
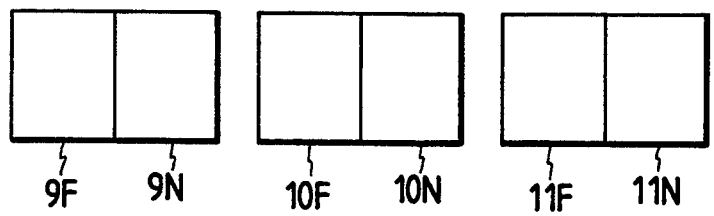
FIGS. 18A to 18D show projected images on light receiving elements in a plurality of distance measuring fields of view.
Figure 18B:
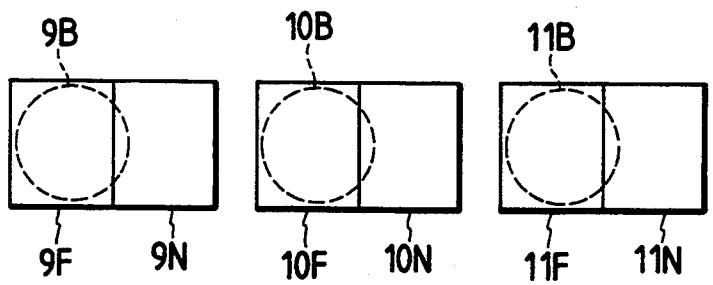
Figure 18C:
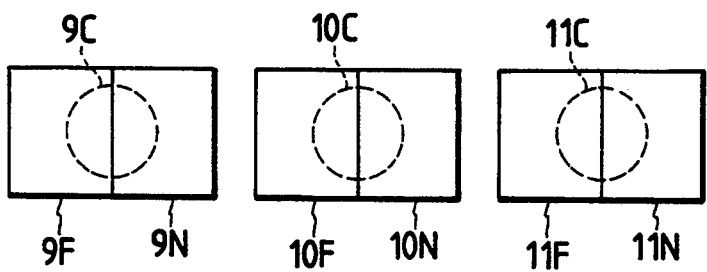
Figure 18D:
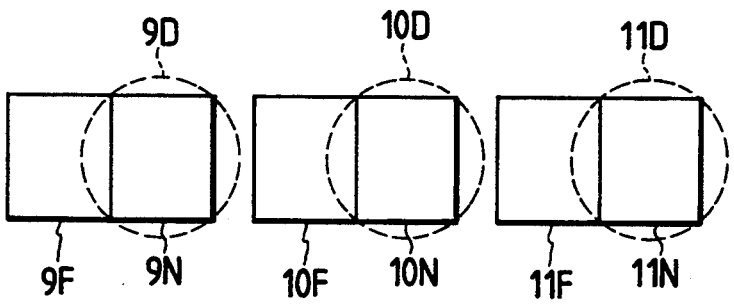

In the above-described construction, under the control of the distance measuring operation controller means 22, distance information for an object in the ordinary distance measuring range is obtained at STEP1, STEP2 and STEP3. At STEP4, the combination is the combination of the light projection element 2 and the light receiving element 11 and therefore, for an object in the ordinary distance measuring range, the projected light image is not incident on the light receiving element 11 as shown in FIGS. 18B, 18C and 18D and thus, the outputs of the comparators 37 and 41 are at L level, but in the case of a distant view through glass, as shown in FIG. 19, slightly diffused and reflected light generally irradiates the light receiving element 11 and the light receiving power is small and therefore, the output of the comparator 37 is at L level, but the output provided by the synchronized integrator means 32, having integrated one light reception output for a predetermined time, becomes an amount of integration sufficient to render the output of the comparator 41 into H level.

Accordingly, the distance information evaluator means 21 can detect the situation for photographing a distant view through glass, by evaluating the output of the comparator 41 when at STEP4, a combination differing from the combination of the light projection and light receiving elements for the ordinary distance measuring field of view is selected, and in this case, a distance suitable for long distance photographing is selected irrespective of the result of distance measurement by a regular combination of the light projection and light receiving elements.

Figure 20:
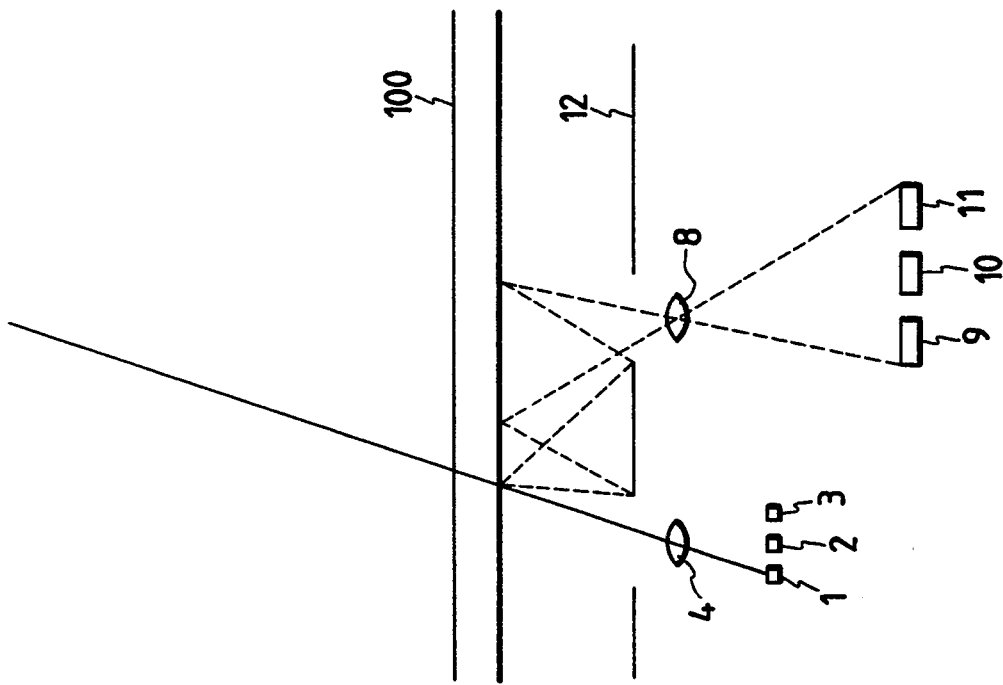
FIG. 20 shows reflected light through glass during right-hand side light projection.
Figure 19:
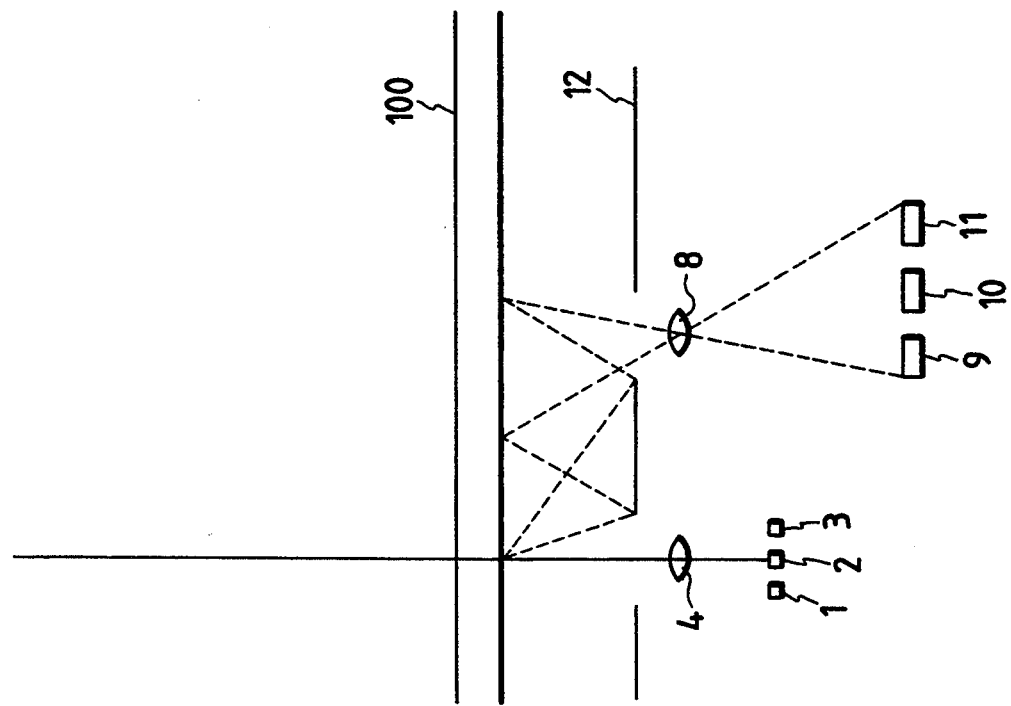
FIG. 19 shows reflected light through glass during central light projection.

In the above-described embodiment, the light reception output by the combination of the light projection element 2 and the light receiving element 11 has been evaluated, but as can be seen from FIG. 19, the light reception output by the combination of the light projection element 2 and the light receiving element 9 may be evaluated, or as shown in FIG. 20, any combination differing from the regular combination, such as the combination of the light projection element 1 and the light receiving element 10 or 11 will do.

In the above-described embodiment, the evaluation of the light reception output is effected by the output of the comparator 41 of the integration level discriminator means 34, but as can be seen from FIG. 19, the light receiving element 11 is generally irradiated and therefore, if a distance calculation is effected, a distance output similar to that when the projected light image is formed substantially at the center of the light receiving element 11 (FIG. 18C) is calculated and therefore, by because the measured distance is not a long distance, a distance through glass may be detected.

As described above, according to the present embodiment, a combination differing from the combination of the light projection and light receiving elements for the ordinary distance measuring field of view is selected, and the light reception output thereof is evaluated by the integrated level or the result of distance calculation, whereby the photographing situation through glass can be detected easily and thus, it becomes possible to automatically select a distance suitable for long distance photographing.

Fourth Embodiment

The distance measuring apparatus according to the above-described third embodiment which has the through-glass photographing detecting function ills designed to select a distance suitable for long distance photographing independently of the light reception output by the original combination when there is light reception output by a combination of the light projection and light receiving elements for detecting the light outside the distance measuring range which differs from the original combination of the light projection and light receiving elements for distance measurement.

In the above-described construction, however, when an attempt is made to photograph exhibits or the like through a show window (glass window), if there is an output of the light receiving element for glass detection, the distance for long distance photographing will be unconditionally selected and therefore, the photograph of an exhibit lying at a distance of 1–2 m will be out of focus.

A fourth embodiment of the present invention which will hereinafter be described is a distance measuring apparatus in which the output of a combination of light projection and light receiving elements differing from the original combination of light projection and light receiving elements for distance measurement is evaluated and the distance for through-glass photographing is selected and wherein when the light receiving power by the original combination of light projection and light receiving elements for distance measurement is great, a provision is made by the distance information evaluator means for selecting the original measured distance, whereby the photographing of an exhibit or the like through glass is made possible.

The basic construction of the fourth embodiment is similar to that of the third embodiment (FIGS. 9-15) and therefore need not be described in detail.

Figure 16:
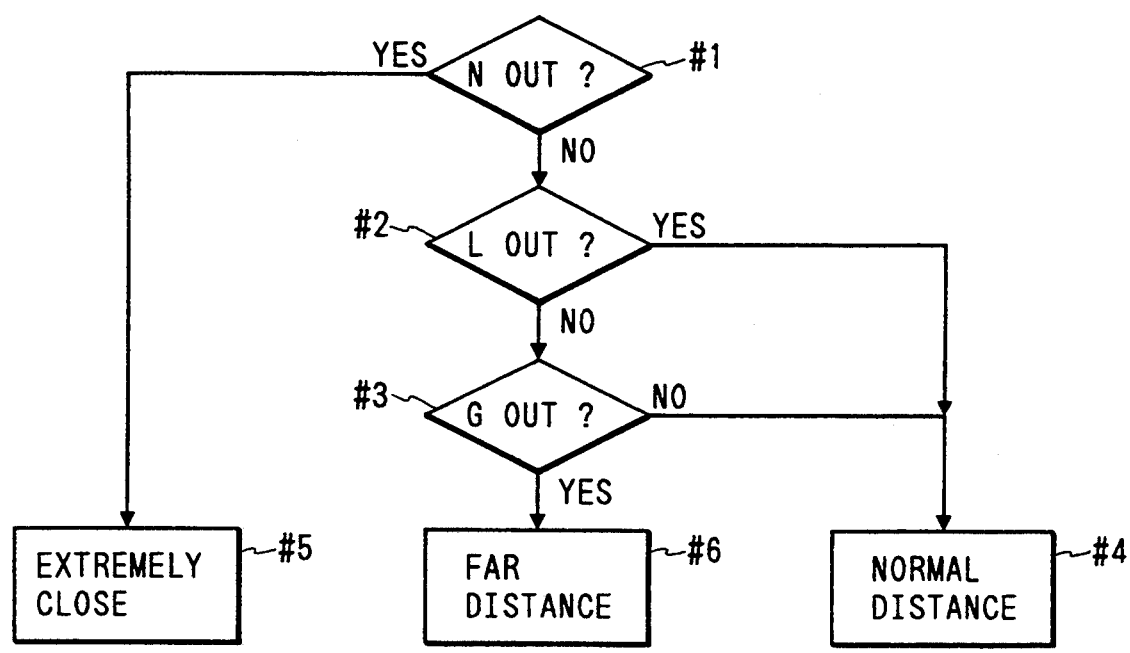
FIG. 16 is a flow chart showing the operation of a fourth embodiment of the present invention.
Figure 17:
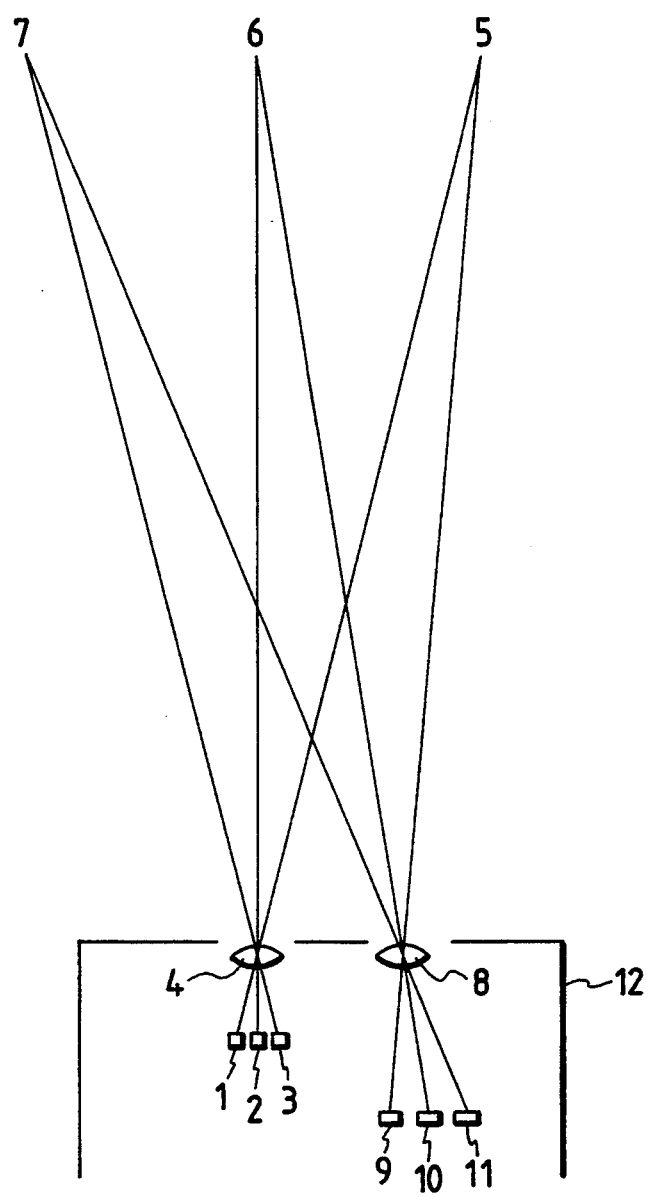
FIG. 17 shows the optical path of a distance measuring apparatus having a plurality of distance measuring fields of view.

As already described, when at the STEP1, STEP2 and STEP3 of FIG. 15, the output of the comparator 37 of the output level discriminator means 33 assumes H level, it shows that the light receiving power is great and the object is within 2 m to 3 m in the regular distance measuring field of view and therefore, the distance information evaluator means 21 memorizes a signal $L_{OUT}$. Also, when at the STEP4, the output of the comparator 37 of the output level discriminator means 33 assumes H level, it shows that the object distance is located at an extremely close distance and therefore, the distance information evaluator means 21 memorizes a signal $N_{OUT}$. When at the STEP 4, the output of the comparator 37 of the output level discriminator means 33 assumes L level and the output of the comparator 41 of the integration level discriminator means 34 assumes H level, it shows that slight reflected light from the glass entering and therefore, the distance information evaluator means 21 memorizes a signal $G_{OUT}$. On the basis of these signals, the operation will hereinafter be described with reference to a flow chart shown in FIG. 16.

(i) The Case of an Ordinary Object

For an ordinary object, light reception at the STEP 4 does not take place and therefore, neither of the signals $N_{OUT}$ and $G_{OUT}$ is memorized and therefore, advance is made to #4, where the object distance is determined on the basis of the measured distance in the normal distance measuring field of view.

(ii) The case of an Extremely Close Object

Since at the STEP 4, a projected light image is formed on the light receiving element 11, the light receiving power is great and the output of the comparator 37 assumes H level and the signal $N_{OUT}$ is memorized and therefore, advance is made from #1 to #5, where an extremely close distance is selected irrespective of the measured distance in the normal distance measuring field of view, and close distance alarm, a release lock, etc. are effected.

(iii) The Case of a Distant View through Glass

At STEP 1, STEP 2 and STEP 3, a medium distance is measured by the slight reflected light by glass, but the light receiving power is small and therefore, the signal $L_{OUT}$ is not memorized, and also at STEP 4, the output of the comparator 37 is at L level and the signal $N_{OUT}$ is not memorized, but yet the output of the comparator 41 assumes H level and the signal $G_{OUT}$ is memorized and therefore, advance is made from #1, #2 and #3 to #6, where a distance suitable for long distance photographing is selected irrespective of the measured distance in the normal distance measuring field of view.

(iv) The case of an Exhibit through Glass (Close Distance)

At STEP 1, STEP 2 and STEP 3, most of the light transmitted through the glass is reflected from the object and is again transmitted through the glass and is imaged on the light receiving element and therefore, the light receiving power is great and the signal $LOU_T$ is memorized. At STEP 4, the signal $N_{OUT}$ is not memorized and the signal $G_{OUT}$ is memorized and therefore, advance is made from #1 and #2 to #4, where the object distance is determined on the basis of the measured distance in the normal distance measuring field of view. The calculation of the measured distance at this time is affected by the slight reflected light from the glass, but the light receiving power differs greatly and therefore, the difference can be neglected.

As described above, according to the present embodiment, when the light receiving power by the original combination of light projection and light receiving elements for distance measurement is great, the distance for long distance photographing is not 10 selected, but the measured distance is selected and therefore, even in the photographing of exhibits or the like through glass, in-focus photographing is made possible without any increase in cost.

What is claimed is:

1. A distance measuring apparatus comprising:
light projecting means for projecting a light toward an object;
first light receiving means for receiving reflected light from the object;
second light receiving means for receiving light which is reflected by glass positioned between said distance measuring apparatus and the object;
distance calculator means for evaluating an output from said first light receiving means to calculate a distance to the object; and
distance information evaluator means for detecting a presence of glass based on an output from said second light receiving means, and for setting predetermined distance information, irrespective of the distance to the object calculated by said distance calculator means, when the presence of glass is detected.

2. A distance measuring apparatus according to claim 1, where the predetermined distance information comprises long distance information.

3. A distance measuring apparatus according to claim 2, wherein said second light receiving means comprises independent light receiving means disposed at a location spaced apart from said first light receiving means.

4. A distance measuring apparatus according to claim 3, wherein said second light receiving means serves also as light receiving means for detecting an object at an extremely close distance.

5. A distance measuring apparatus according to claim 4, wherein said distance information evaluator means evaluates light receiving states of said first and second light receiving means, and when said second light receiving means mainly receives the reflected light, said distance information evaluator means detects that the object is located at an extremely close distance.

6. A distance measuring apparatus according to claim 1, wherein said light projecting means comprises a plurality of light projection elements, said first light receiving means comprises a plurality of light receiving elements corresponding to said plurality of light projection elements, said distance calculator means measures the distance to the object based on a predetermined combination of said plurality of light projection and light receiving elements, and said second light receiving means comprises a light receiving element of said first light receiving means which is combined with said plurality of light projection elements in a combination other than the predetermined combination.

7. A distance measuring apparatus according to claim 6, wherein the predetermined distance information comprises long distance information.

8. A distance measuring apparatus according to claim 1, wherein even when said distance information evaluator means detects the presence of glass, said distance information evaluator means determines distance information based on the distance to the object calculated by said distance calculator means if a quantity of light received by said first light receiving means exceeds a predetermined value.

9. A distance measuring apparatus comprising:
light projecting means for projecting a light toward an object;
light receiving means for receiving reflected light from the object;
glass detecting means for receiving light which is reflected by glass positioned between said distance measuring apparatus and the object;
distance calculator means for evaluating an output from said light receiving means to calculate a distance to the object; and
distance information evaluator means for detecting a presence of glass based on an output from said glass detecting means, and for setting predetermined distance information, irrespective of the distance to the object calculated by said distance calculator means, when the presence of glass is detected.

10. A distance measuring apparatus according to claim 9, wherein the predetermined distance information comprises long distance information.

11. A distance measuring apparatus according to claim 10, wherein said glass detecting means comprises independent light receiving means disposed at a location spaced apart from said light receiving means.

12. A distance measuring apparatus according to claim 11, wherein said glass detecting means further detects an object at an extremely close distance.

13. A distance measuring apparatus according to claim 12, wherein said distance information evaluator means evaluates said light receiving means and said glass detecting means, and when said glass detecting means mainly receives the reflected light, said distance information evaluator means detects that the object is located at an extremely close distance.

14. A distance measuring apparatus having a plurality of light projection elements for projecting a light toward an object, and a plurality of light receiving elements for receiving the projected light which is reflected by the object, said distance measuring apparatus being capable of measuring a plurality of distance measuring fields of view by making the plurality of light projection and light receiving elements correspond to one another in a predetermined combination, said distance measuring apparatus comprising:
selector means for combining one of the light projection elements and one of the light receiving elements in a combination other than the predetermined combination; and
distance information evaluator means for evaluating information output from each of the plurality of light receiving elements, and for detecting a presence of glass between said distance measuring apparatus and the object based on a quantity of reflected light received when using the combination of the one light projection element and the one light receiving element other than the predetermined combination.

15. A distance measuring apparatus according to claim 14, wherein lone distance information is set as distance information when said distance information evaluator means detects the presence of glass.

16. A distance measuring apparatus according to claim 14, wherein even when said distance information evaluator means detects the presence of glass, if the output from the predetermined combination of light projection and light receiving elements exceeds a predetermined value, distance information is set according to the output from the predetermined combination of light projection and light receiving elements.

17. A distance measuring apparatus according to claim 16, wherein an extremely close distance is set as distance information when the quantity of reflected light received when using the combination of the one light projection element and the one light receiving element other than the predetermined combination exceeds a predetermined quantity.

18. A distance measuring apparatus comprising:
(a) light projecting means for projecting a light onto an object;
(b) light receiving means for receiving reflected light from the object, said light receiving means having first and second light receiving portions; and
(c) a processing circuit for finding a distance to the object by using a first output from said light receiving means which is based on reflected light received by said first light receiving portion, and for judging whether a light-transmitting substance, which has a characteristic of reflecting part of a light, is disposed between said distance measuring apparatus and the object by using a second output from said light receiving means which is based on reflected light received by said second light receiving portion.

19. A distance measuring apparatus according to claim 18, wherein said processing circuit judges that the light-transmitting substance is present between said distance measuring apparatus and the object when the second output is in a first state, and judges that the distance to the object is shorter than a predetermined distance when the second output is in a second state.

20. A distance measuring apparatus comprising:
(a) light projecting means for projecting a light onto an object;
(b) light receiving means for receiving reflected light from the object, said light receiving means having first and second light receiving portions, said first light receiving portion being located at a first position for receiving reflected light from the object when the object is within a first distance from said distance measuring apparatus, and said second light receiving portion being located at a second position for receiving reflected light from the object when the object is within a second distance from said distance measuring apparatus, the second distance being nearer than the first distance; and (c) a processing circuit for finding a distance to the object by using a first output from said light receiving means which is based on reflected light received by said first of light receiving portion, and for judging a long distance to the object by using a second output from said light receiving means which is based on reflected light received by said second light receiving portion.

21. A distance measuring apparatus according to claim 20, wherein said processing circuit judges that the distance to the object is a long distance when the second output is in a first state, and judges that the distance to the object is shorter than a predetermined distance when the second output is in a second state.

22. A distance measuring apparatus comprising:
   (a) light projecting means for projecting a light onto different areas of a scene;
   (b) light receiving means, having a plurality of light receiving portions, for receiving light reflected from an object in the scene from each of the different areas of the scene, said plurality of light receiving portions corresponding to the reflected light from each of the different area in a predetermined combination; and
   (c) a processing circuit for finding a distance to the object in each of the different areas based on an output from each of said plurality of light receiving portions, and for judging whether a light-transmitting substance is present between said distance measuring apparatus and the object, based on the output of at least one of said light receiving portions when the predetermined combination is changed.

23. A distance measuring apparatus according to claim 22, wherein said processing circuit sets a long distance as the distance to the object when said processing circuit judges that a light-transmitting substance is present between said distance measuring apparatus and the object.

24. A distance measuring apparatus comprising:
   (a) light projecting means for projecting a light onto different areas of a scene;
   (b) light receiving means, having a plurality of light receiving portions, for receiving light reflected from an object in the scene from each of the different areas, said plurality of light receiving portions corresponding to the reflected light from each of the different areas in a predetermined combination; and
   (c) a processing circuit having a first mode for finding a distance to the object in each of the different areas based on an output from each of said plurality of light receiving portions, and a second mode for judging that the distance to the object is a long distance based on the output of at least one of said light receiving portions when the predetermined combination is changed.

25. A distance measuring apparatus comprising:
   (a) light projecting means for projecting a light onto different areas of a scene;
   a plurality of light receiving means for receiving light reflected from an object in the scene from each of the different areas of the scene; and
   (c) a processing circuit having a first mode for making the reflected light from each of the different areas and said plurality of light receiving means correspond to each other in a predetermined combination, and for finding a distance to the object in each of the different areas by an output of each of said plurality of light receiving means in the predetermined combination, and a second mode for judging whether the light has been projected through a light-transmitting substance, using at least one of the outputs of said light receiving means in a combination other than the predetermined combination.

* * * * *

UNITED STATES PATENT AND TRADEMARK OFFICE
CERTIFICATE OF CORRECTION

PATENT NO. : 5,361,118
DATED : November 1, 1994
INVENTOR(S) : Taka et al.

Page 1 of 3

It is certified that error appears in the above-indentified patent and that said Letters Patent is hereby corrected as shown below:

In the drawings:

Sheet 7

Figure 10, "_____" at the top should be deleted.

Column 1

Line 64, "11F" should read --11N--.

Column 2

Line 22, "results. 10 Also" should read --results.--; insert paragraph new indentation --Also--.

Column 7

Line 54, "10" should be deleted.

Column 9

Line 44, "output T2" should read --outputs T2--;

UNITED STATES PATENT AND TRADEMARK OFFICE
CERTIFICATE OF CORRECTION

PATENT NO. : 5,361,118
DATED : November 1, 1994
INVENTOR(S) : Taka et al.

Page 2 of 3

It is certified that error appears in the above-indentified patent and that said Letters Patent is hereby corrected as shown below:

Column 9

Line 47, "output T3" should read --outputs T3;
Line 50, "output T2" should read --outputs T2.

Column 10

Line 35, "by" should be deleted;
Line 52, "ills" should read --is--.

Column 11

Line 35, "entering" should read --is entering--;
Line 48, "case" should read --Case--;
Line 57, "close" should read --a close--.

Column 12

Line 4, "case" should read --Case--;
Line 11, "LOU$_T$is" should read --L$_{OUT}$ is--;
Line 25, "10" should be deleted
Line 50, "where" should read --wherein.

Column 14

Line 13, "lone" should read --long--;
Line 25, "claim 16," should read --claim 14,--.

UNITED STATES PATENT AND TRADEMARK OFFICE
CERTIFICATE OF CORRECTION

PATENT NO. : 5,361,118  
DATED : November 1, 1994  
INVENTOR(S) : Taka et al.

Page 3 of 3

It is certified that error appears in the above-indentified patent and that said Letters Patent is hereby corrected as shown below:

<u>Column 15</u>

Line 6,    "of should be deleted;  
    Line 25,   "area" should read --areas--.

<u>Column 16</u>

Line 24,   "a" should read --(b) a--.

Signed and Sealed this

Fourth Day of April, 1995

BRUCE LEHMAN

Attest:

*Attesting Officer*      *Commissioner of Patents and Trademarks*